UNITED STATES PATENT OFFICE.

EDWARD E. ORR, OF MOUNT HOPE, KANSAS, ASSIGNOR OF ONE-HALF TO THAD McCORMICK, OF MOUNT HOPE, KANSAS.

MOLD.

954,645.  Specification of Letters Patent.  Patented Apr. 12, 1910.

Application filed February 9, 1909. Serial No. 476,907.

*To all whom it may concern:*

Be it known that I, EDWARD E. ORR, a citizen of the United States, residing at Mount Hope, in the county of Sedgwick and State of Kansas, have invented a new and useful Mold, of which the following is a specification.

It is the object of the present invention to provide a mold for plastic material which will be universal in its application or use. The mold is designed primarily for the purpose of molding plastic fence posts but owing to a peculiar arrangement of the division plates of the mold, the same may be adapted for molding porch slabs and other elements employed in architecture.

Ordinarily, difficulty is experienced in removing the division plates of a mold without removing also a portion of the post or other element being molded, these division plates being of course removed while the plastic material is in a green state, and it is therefore one object of the present invention to so construct these division plates that their removal may be readily accomplished without the molded element being in any way affected.

Another object of the invention is to so construct the mold as to provide for the ready disposal therewithin of tie or bonding rods which are to be molded in the elements such as the fence posts or the like, the construction being such that these tie rods may be placed in position after the mold has otherwise been assembled.

Other novel features and advantages of the construction embodying the invention will be apparent from the specific description which is to follow and from the drawings, in which—

Figure 1 is a top plan view of the mold embodying the invention. Fig. 2 is a detail perspective view of one of the side members thereof. Fig. 3 is a similar view of one of the end members, and Fig. 4 is a detail vertical sectional view through one of the division plates.

In the drawings, the mold embodying the invention is shown as comprised in part of a frame made up of opposed side members 5 and opposed end members 6 which are assembled, as will be presently described, so as to form a rectangular frame. The side members 5 of the frame are in the nature each of a plate having a reinforcing rib 7 formed upon its outer face and each of these plates is formed through its upper edge at its ends with a slot 8 which receives the portion of the plate which comprises one of the end members 6, the said plate comprising the end member being also slotted as indicated by the numeral 9 it being understood that the members 5 and 6 when assembled with their ends interlocked, are held securely and firmly against lateral displacement with respect one to the other. Each of the plates comprising the members 6 is formed also upon its outer face with a reinforcing rib 10 and preferably these plates 6 are of less thickness than the plates 5. Each of the plates 5 is formed in its inner face with a plurality of vertically extending grooves 11, these grooves opening at their ends through the upper and lower edges of the said plates. As clearly shown in the drawings, and for a purpose to be presently described, each of the grooves 11 has its side walls converged downwardly, or in other words, the grooves are tapered downwardly and seated at their ends in the corresponding grooves in the two side members 5 are division plates 12 which as shown in Fig. 4 of the drawings, are each beveled from their upper to their lower edges. The bevel of the division plates corresponds to the taper of the grooves in which their ends are seated and the plates are of a height equal to the height of the plates 5 so that when the plates are disposed at their ends in the said grooves 11, their bevel and the taper of the grooves will limit their downward movement to such degree that their upper and lower edges will be coincident or in the same plane with the upper and lower edges of the side members 5 of the mold frame. A further advantage accruing from the beveling of the division plates 12 will be hereinafter brought out.

It will be noted from an inspection of the top plan view of the drawings that all of the grooves 11 in the two side members 5 are not correspondingly located, the arrangement of the grooves being such that, starting with the end or outermost ones of the division plates 12, these and every other one of the said plates will be parallel with the end members 6 of the mold frame whereas alternate ones of the plates 12 will lie at an angle to the first mentioned ones of the plates 12 or in other words at an angle to the end members 6 of the mold frame. As a result, the mold, when all of the plates are in position, will be adapted to mold fence posts which are tapered from their lower to their upper ends although it will be understood that by removing the second referred to or alternate ones of the plates 12, parallel division plates will only be apparent in the mold, and sills, slabs, etc., may be then molded and will be of true rectangular form. It will of course be understood that these division plates 12 are to be preferably of sheet metal or other sheet material, and in order to prevent outward bulging of the end or outermost ones of the plates 12 each of the end members 6 of the mold frame is formed upon its inner face with a plurality of lugs or bosses 13 which, when the said end or outermost ones of the plates 12 and the said end members 6 are in position, bear against the outer faces of the said plates 12 and serve to prevent their outward bulging as stated. This reinforcing of the outermost ones of the plates 12 will of course serve to reinforce the intermediate ones of the plates 12 when the compartments between the plates are filled with the plastic material to be molded.

It is intended, that in using the mold embodying the invention as heretofore described, that the same be placed or set up upon a bed of firmly tamped or compacted sand and it will now be apparent that the tapering of the groove which receives the ends of the division plates 12, and the corresponding beveling of these plates, provides positively against the plates 12 working downwardly into the bed of sand.

As it is customary, to mold, in plastic fence posts or other elements, tie or bonding rods or other similar elements, there are provided in the mold embodying the present invention, means for supporting such bonding rods or the like and such means is embodied in sockets 14 and grooves 15 which are formed in the inner faces of the side members 5 of the mold frame and alternate. These sockets and grooves are located each between a pair of the slots 11 for receiving the ends of the division plates 12 and in arranging the tie rods within the mold, one end of each rod is seated in one of the sockets 14 and the other end of the rod is dropped into the groove 15 which is located opposite to the socket and in the other one of the side members 5. The bottoms of the grooves 15 are of course in the same plane with the socket 14 so that the rods extend directly medially of the posts as far as their dimension from front to rear is concerned and as a result, such fastening devices as may be associated with the tie rod are in this manner made to project all to a corresponding distance beyond the front face of the post.

From the foregoing description of the invention, it will be understood that, as heretofore stated, the alternate ones of the plates 12 may be removed from the mold frame and the mold be employed in the manufacture of sills, slabs, and other elements employed in architecture.

What is claimed is:—

In a mold of the class described, side members, end members, the side members being each in the form of a plate formed upon its outer face with a reinforcing rib, the said side and end plates being notched at their ends and having their notched ends interlocked to afford a rectangular frame, the opposing faces of the end plates being formed with notches, division plates seated at their ends in corresponding notches in the said end plates, and reinforcing lugs formed upon the inner faces of the side plates and bearing against the next adjacent division plates.

In testimony that I claim the foregoing as my own, I have hereto affixed my signature in the presence of two witnesses.

EDWARD E. ORR.

Witnesses:
CHAS. F. P. RANDALL,
HARRY J. VENJOHN.